(No Model.)

C. J. T. BURCEY.
ALCOHOL STILL.

No. 263,852. Patented Sept. 5, 1882.

WITNESSES
J. C. Laass
Chas. M. Raymond

INVENTOR
Charles J. T. Burcey
per Duell, Laass & Hey
his Attys

UNITED STATES PATENT OFFICE.

CHARLES J. T. BURCEY, OF BINGHAMTON, NEW YORK.

ALCOHOL-STILL.

SPECIFICATION forming part of Letters Patent No. 263,852, dated September 5, 1882.

Application filed May 18, 1882. (No model.)

*To all whom it may concern:*

Be it known that I, CHARLES J. T. BURCEY, of Binghamton, in the county of Broome, in the State of New York, have invented new and useful Improvements in Alcohol-Stills, of which the following, taken in connection with the accompanying drawings, is a full, clear, and exact description.

This invention is designed as a further improvement on the stills for which I have obtained Letters Patent No. 229,585, dated July 6, 1880; and it consists chiefly in a novel construction and combination of the vapor-condensers and means for returning to the boiler or heating-tank the heavy products of distillation which become separated from the vapor in its passage through the condensers, all as hereinafter more fully explained.

Figure 1:
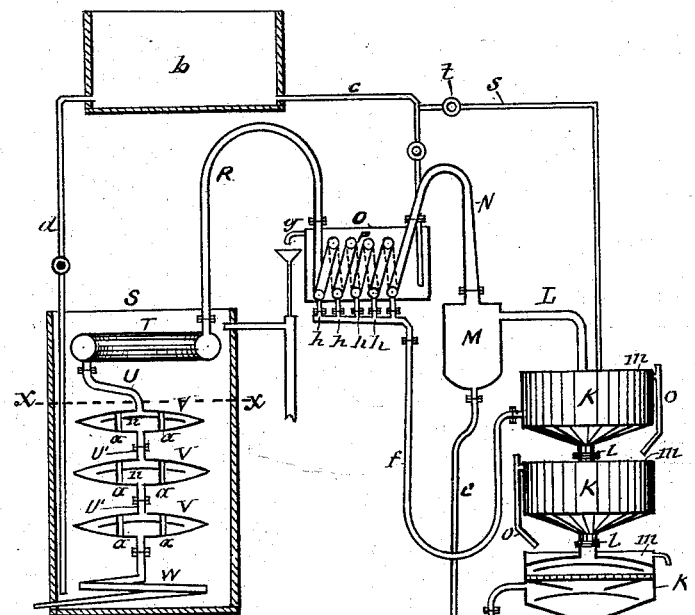
Figure 3:
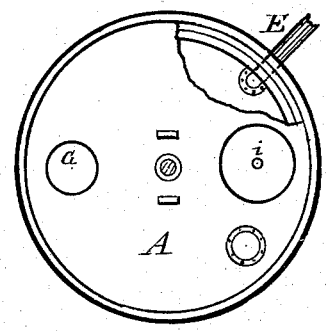
Figure 2:
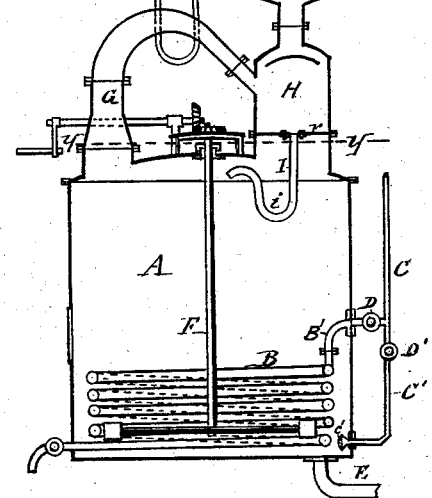
Figure 2:
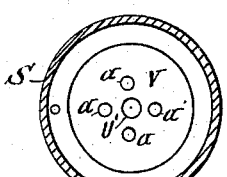

In the annexed drawings, Figure 1 is a vertical section of a still embodying my improvements. Fig. 2 is a horizontal section on line $x\ x$, and Fig. 3 is a horizontal section on line $y\ y$ in Fig. 1.

Similar letters of reference indicate corresponding parts.

A denotes the boiler or tank in which to heat the spirits to be distilled, the heat being supplied by a coil-pipe, B, situated inside of the tank, and a steam-pipe, C, conveying steam to the coil by a pipe, B', provided with a stop-cock, D, which serves to control the influx of steam. A branch pipe, C', is extended from the steam-pipe C and enters the tank at or near the bottom thereof. By means of a stop-cock, D', applied to the pipe C' the steam can be prevented from passing through said pipe until it becomes necessary to admit steam at the bottom of the tank for the purpose of assisting the coil B to heat the liquid spirits, which assistance is especially required when the liquid is low in the tank. A perforated cap, c', is applied to the discharge end of the pipe C' for the purpose of diffusing the steam issuing from said pipe.

F represents the rotary agitator, arranged in the tank for the purpose of stirring the substance under treatment, and also for assisting in cleaning the tank, a pipe, E, being connected to the bottom of the tank for the discharge of the rinsing-water.

To the top of the tank A is connected a capacious vapor-duct, G, which rises a certain height and then deflects descendingly to a dome, H, built upon the top of the tank. This pipe or duct G conveys the vapor or products of distillation from the tank to the dome. The foam, which frequently rises in the tank A during the process of distillation, is prevented from following the vapor in its aforesaid passage by the intermediate elevated portion of the duct G, thus obviating the liability of clogging the return-pipe I, hereinafter described. The dome H is deprived of direct communication with the tank A by a diaphragm extended across the base of the dome. An indirect communication, however, is formed by a pipe, I, pendent from the diaphragm $r$, and terminating inside of the tank in proximity to the crown-sheet thereof, a downward deflection of the intermediate portion of the pipe I forming a trap, $i$, which prevents the escape of vapor from the tank through the said pipe, the function of the pipe I being to return to the tank the heavy products of distillation condensed in the condensers K K, which are superstructed and communicate with the top of the dome H, and are constructed similar to the tier of condensers illustrated in my patent, No. 229,585, of July 6, 1880, said condensers consisting of chambers arranged one above the other and communicating with each other by interposed pipe-connections $l$. By a series of diaphragms and deflecting-plates arranged inside of the condensers K the vapor ascending through them receives a retarded and tortuous course, which produces more or less condensation of the vapor and a precipitation of the heavy products of distillation, which latter descends to the bottom of the dome H, and from thence passes through the pipe I to the interior of the tank for redistillation. Each of the condensing-chambers K is provided on its top with a water-receptacle, $m$, having an overflow-pipe, $o$, by which the water is conducted successively from one chamber to the other; the water being conducted to the uppermost condensing-chamber K from an elevated reservoir, $b$, by a pipe, $s$, provided with a cock, $t$, for controlling the flow of the water.

From the top of the series of condensing-chambers K is extended a vapor-duct, L, which intersects a chamber, M, at or near the top thereof. From the bottom of this chamber to one of the condensers K is extended a pipe, $e$, for the purpose of conveying to the latter such portion of the vapor which may become condensed and precipitated in the chamber M, the pipe e being bent to form a trap, which prevents the vapor from ascending from the condenser K through the said pipe.

From the top of the chamber M rises a pipe, N, which, by a downward deflection, communicates with a worm, P, disposed with its axis horizontal through a vat, O, which latter is filled with cold water by a pipe, c, leading from the water-tank b. An overflow, g, connected with the vat, maintains the water at a uniform height.

The bottom of each of the successive coils of the worm P is tapped by a pendent pipe, h, which draws therefrom the liquid produced by the condensation of the heavier particles of the vapor circulating through the worm.

A pipe, f, connected to the respective pipes h h, and extended to one of the condensing-chambers K, serves to convey to the latter the aforesaid liquid, the pipe being bent, in the usual way, to form an intermediate trap.

To the end of the worm P is connected a vapor-duct, R, which communicates with an annular pipe, T, arranged horizontally on the upper part of a tank, S, which is filled with water by a pipe, d, extended from the reservoir b.

Underneath the pipe T are arranged a series of flat chambers, V V, extended nearly across the tank, and placed one below the other. The respective chambers are constructed of two concavo-convex plates, placed with their concave side facing each other and united at their edges. The top of the upper chamber V is connected with the annular pipe T by a pipe, U, and each of the chambers is connected with its subjacent chamber by a central pipe, U'. The lowermost chamber communicates at the center of its bottom with a coil-pipe, W, which has its discharge end extended through the side of the tank for the delivery of the distilled spirits. Each of the chambers V is provided internally with a diaphragm, preferably of concavo-convex form, and placed with its convex side upward, which diaphragms deflect and retard the flow of the vapor and bring the same more intimately in contact with the shell of the chamber cooled by the surrounding water. By means of flues $a\,a$, extended vertically through the chambers V, and open at both ends, the water is caused to circulate through said chambers and further subject the vapor to the cooling influence of the water.

Having described my invention, what I claim is—

The improved still-condenser consisting of the tank S, annular pipe T, pipe U, chambers V V, formed of a convex top plate and a concave bottom plate united at their edges, a convex diaphragm, $n$, inside of said chambers, flues $a\,a$, extended vertically through the same, pipes $l\,l$, connecting the chambers, and the coil W, or other outlet-pipe, all as shown and set forth.

In testimony whereof I have hereunto signed my name and affixed my seal, in the presence of two attesting witnesses, at Syracuse, in the county of Onondaga, in the State of New York, this 18th day of March, 1882.

CHARLES J. T. BURCEY. [L. S.]

Witnesses:
C. H. DUELL,
WM. C. RAYMOND.